United States Patent
Butcher et al.

(10) Patent No.: US 8,267,179 B2
(45) Date of Patent: Sep. 18, 2012

(54) CONNECTION TOOL WITH INDEXING SYSTEM

(75) Inventors: David John Butcher, Hampshire (GB); Richard John Wood, South Gloucestershire (GB)

(73) Assignee: VerdErg Connectors Limited, Surrey (GB)

( * ) Notice: Subject to any disclaimer, the term of this patent is extended or adjusted under 35 U.S.C. 154(b) by 468 days.

(21) Appl. No.: 12/375,404

(22) PCT Filed: Jun. 8, 2007

(86) PCT No.: PCT/EP2007/055647
§ 371 (c)(1), (2), (4) Date: Apr. 8, 2010

(87) PCT Pub. No.: WO2008/012135
PCT Pub. Date: Jan. 31, 2008

(65) Prior Publication Data
US 2010/0186963 A1    Jul. 29, 2010

(30) Foreign Application Priority Data
Jul. 27, 2006  (GB) .................................. 0614876.1

(51) Int. Cl.
*E21B 43/013* (2006.01)

(52) U.S. Cl. ....................................................... 166/341
(58) Field of Classification Search .................. 166/338, 166/339, 340, 341, 342, 343, 344, 345, 347, 166/349, 350, 351, 367, 378, 381
See application file for complete search history.

(56) References Cited

U.S. PATENT DOCUMENTS

| 3,481,396 A | 12/1969 | Williams et al. ............... 166/0.6 |
| 3,722,585 A | 3/1973 | Nelson et al. .................. 166/0.6 |
| 4,661,017 A * | 4/1987 | Wood et al. .................... 405/169 |
| 6,109,830 A * | 8/2000 | de Baan ......................... 405/170 |
| 2004/0258482 A1* | 12/2004 | Mackinnon .................... 405/188 |
| 2011/0005764 A1* | 1/2011 | Bekkevold ..................... 166/344 |

FOREIGN PATENT DOCUMENTS

| GB | 2 195 970 | 4/1988 |
| WO | 03/050443 | 6/2003 |
| WO | 2004/106696 | 12/2004 |

OTHER PUBLICATIONS

Intel Engineering, "How does FTC Work" URL=http://www.intecengineering.com/expertise/dmac/ftc/how.asp, download date Nov. 24, 2006.

* cited by examiner

*Primary Examiner* — Thomas Beach
*Assistant Examiner* — James Sayre
(74) *Attorney, Agent, or Firm* — Seed IP Law Group PLLC

(57) ABSTRACT

A connection tool for connecting a pipeline to a subsea connection structure which includes a connection porch (22) into which the pipeline is connected, the tool comprising:—a tool chassis (26);—a carrier (28) mounted on the chassis (26) and adapted to releasably carry the pipeline;—at least one locating member (30) positioned at the front of the chassis (26) so as to be engageable with the locating posts (24) on the connection porch (22) to hold the chassis (26) adjacent to the connection porch (22), a hinge connecting the locating member (30) to the chassis (26), such that the azimuthal orientation of the chassis relative to the connection porch can be varied when the locating member (30) is engaged with the locating post, wherein the locating member (30) includes a locking member that engages the locating post when the locating member (30) is engaged thereon.

9 Claims, 12 Drawing Sheets

CONNECTION TOOL WITH INDEXING SYSTEM

TECHNICAL FIELD

This invention relates to tools and methods for connecting pipelines to subsea connection structures such as those used in offshore oil and gas production fields. Typical uses include connection of pipelines to riser bases, flowline termination assemblies, manifolds and Christmas trees.

BACKGROUND ART

When connecting pipelines such as flowlines, jumpers and risers of either rigid or flexible construction (hereinafter 'pipelines') to subsea connection structures, a connection tool can be used which connects to the end of the pipeline and is then brought to the connection structure where it operates to make the connection between the pipeline and connection structure. Examples of such tools are the DMaC and FTC tools of VerdErg which are described on the Internet web site www.verderg.com.

In the FTC system, a connection porch having one or more locating posts is provided at the connection structure (manifold, riser base, midwater riser, flowline termination assembly, Christmas tree, etc.). The connection tool comprises a tool chassis with a carrier mounted on the chassis and adapted to releasably carry the pipeline to be connected to the connecting structure. A pair of locating sleeves are located at the front of the chassis which slide over the posts and hold the tool adjacent the porch while the connection of the pipeline to connection structure is made.

The most controllable movements when manoeuvring the connection tool are to lower onto the locating posts and to lift off and move horizontally, either using support from the surface or with an ROV. Manoeuvres that require simultaneous horizontal and vertical movements are more difficult to control accurately.

When connecting to a riser connection on a riser tower, the porch is often downward facing requiring the end of the pipeline to face upwards when the connection is made. The FTC connection tool addresses this by allowing the chassis to pivot on the locating sleeves so as to swing into the required position. In this way, the tool can be engaged on the locating posts by a vertical movement. However, when lifting the tool off the locating posts at the end of the connection process, problems can occur if the load of the connection tool is not appropriately distributed on the lifting mechanism. If the load is incorrectly distributed, the connection tool can swing in an uncontrolled way as soon as the sleeves disconnect from the locating posts, potentially causing damage to the connection structure or other installations.

It is an object of the invention to provide a system that helps ensure even distribution of the load on disconnection by ensuring that the connection tool is properly oriented before it is allowed to disconnect from the locating posts.

DISCLOSURE OF THE INVENTION

A first aspect of the invention provides a connection tool for connecting a pipeline to a subsea connection structure which includes a connection porch into which the pipeline is connected, at least one locating post being positioned adjacent to the connection porch, the tool comprising:

a tool chassis;
a carrier mounted on the chassis and adapted to releasably carry the pipeline to be connected to the connection structure;
at least one locating member positioned at the front of the chassis so as to be engageable with the or each locating post on the connection porch to hold the chassis adjacent to the connection porch, a hinge connecting the locating member to the chassis that allows pivoting movement around a transverse axis such that the azimuthal orientation of the chassis relative to the connection porch can be varied when the locating member is engaged with the locating post,
wherein the locating member includes a locking member that engages the locating post when the locating member is engaged thereon and prevents disengagement of the locating member unless the chassis is in a predetermined azimuthal orientation relative to the connection porch.

The locating member preferably comprises a sleeve that can slide over the locating post to hold the chassis in position relative to the connection porch. A particularly preferred embodiment comprises a pair of hinged sleeves provided on the chassis in an arrangement corresponding to that of a pair of locating posts on the connection porch.

The hinge can include a cam surface that acts on the locking member. In such a case, hinging of the chassis away from the predetermined azimuthal orientation can cause the cam surface to act on the locking member to urge it into engagement with the locating post.

The locking member can comprise a peg that engages in a slot in the locating post.

The predetermined azimuthal orientation can be horizontal or vertical or any angle therebeween depending on application.

A second aspect of the invention provides a method of connecting one end of a pipeline into a connection porch on a subsea connection structure, at least one locating post being positioned adjacent to the connection porch, the method comprising:
(a) attaching the end of the pipeline to a connection tool comprising:
  (i) a tool chassis;
  (ii) a carrier mounted on the chassis for carrying the end of the pipeline to be connected to the connection structure;
  (iii) at least one locating member positioned at the front of the chassis, the locating member including a locking member; and
  (iv) a hinge connecting the locating member to the chassis;
(b) manoeuvring the connection tool such that the locating member engages with the or each locating post when the chassis is in a predetermined azimuthal orientation relative to the connection porch;
(c) varying the azimuthal orientation of the chassis relative to the connection porch, thereby causing the locking member to engage the locating post and prevent disengagement of the locating member;
(d) connecting the end of the pipeline to the connection structure at the connection porch;
(e) detaching the pipeline from the connection tool;
(f) returning the chassis to the predetermined azimuthal orientation such that the locking member is disengaged from the locating post;
(g) disengaging the locating member from the locating post; and
(h) manoeuvring the connection tool away from the connection structure.

When the connection porch faces in a downward direction and the or each locating post projects upward from the connection porch, the method preferably comprises engaging the locating post with the locating member with the chassis in the predetermined orientation (e.g. horizontal), hinging the chassis downwards to bring the end of the pipeline into alignment with the downward facing connection porch, connecting the pipeline to the connection porch and raising the chassis back to the predetermined orientation for disengagement from the or each locating post.

The method according to the second aspect of the invention is preferably performed using a connection tool according to the first aspect of the invention.

MODE(S) FOR CARRYING OUT THE INVENTION

Figure 1:
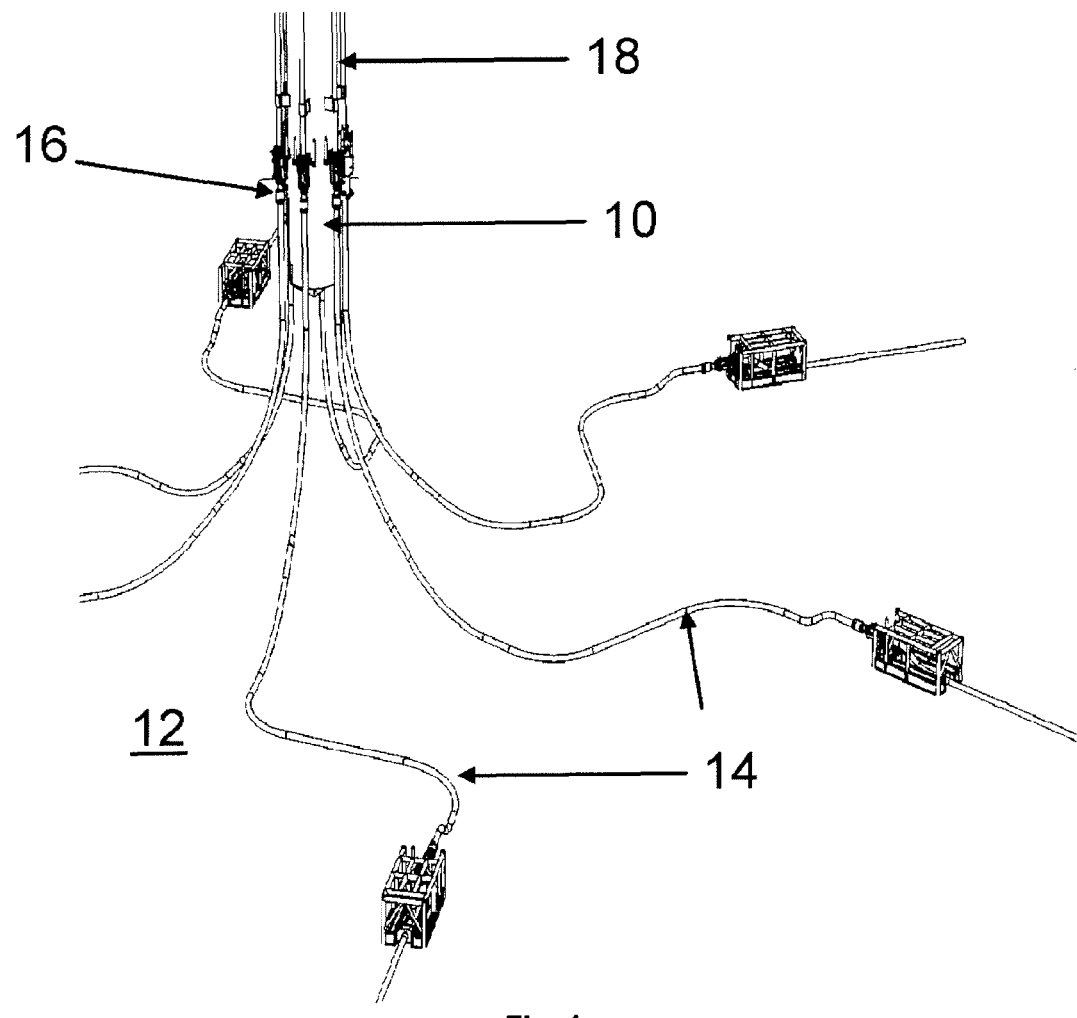
FIG. 1 shows a typical riser tower subsea installation for which the present invention can be used.
Figure 2:
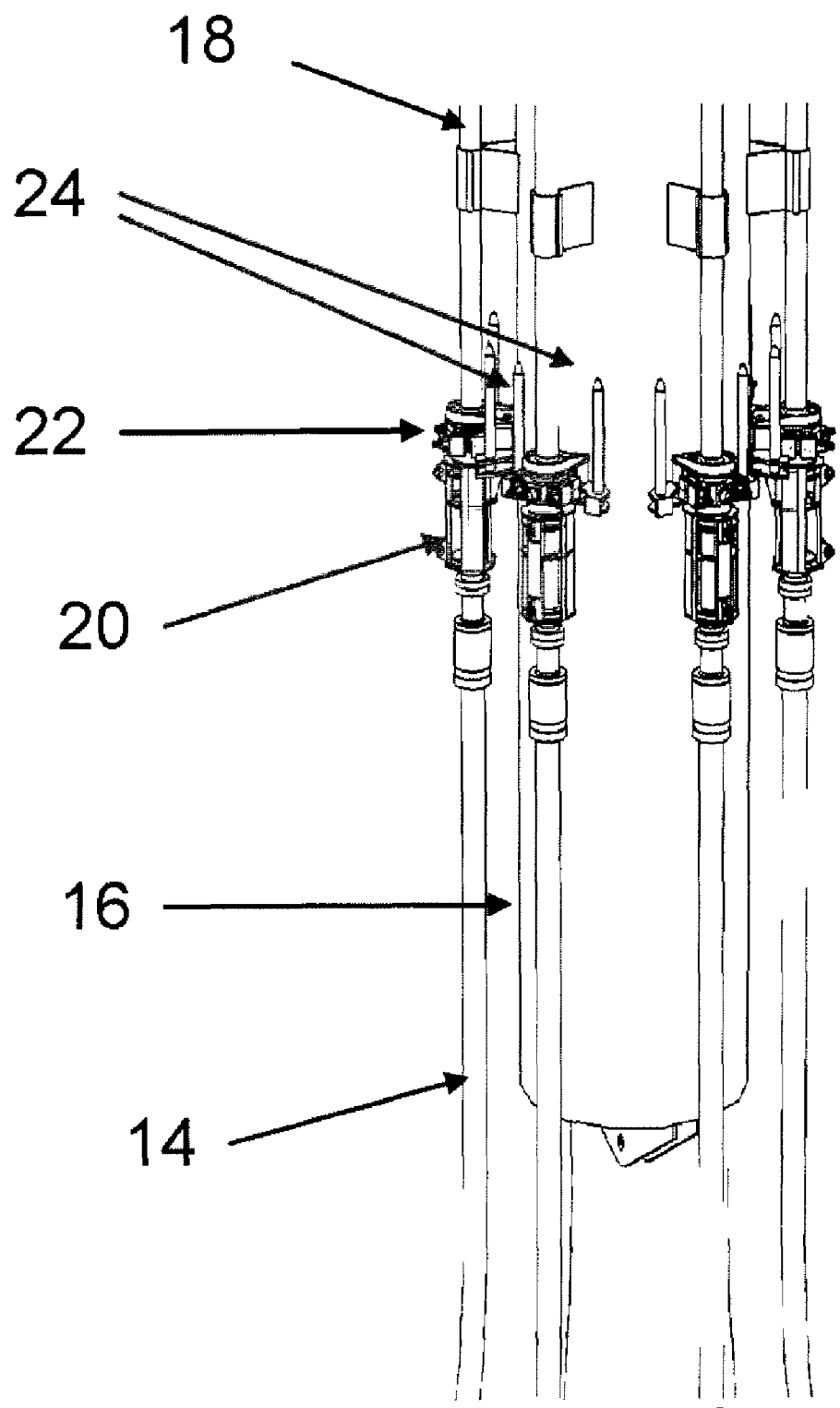
FIG. 2 shows detail of the riser base.

FIG. 1 shows a typical riser tower subsea installation for which the present invention can be used. The riser tower 10 is moored to the sea bed 12. Jumpers 14 running from the flowline termination assemblies (not shown) on the sea bed connect to the riser base 16, and flow conduits 18 run to the riser top where they connect to flexible risers extending to a surface production platform such as an FPSO (not shown). FIG. 2 shows more detail of the riser base 16. The jumpers 14 connect to the downward facing ends of the conduits 18 at a connection structure 20. The connection structure includes a connection porch 22 having a pair or upwardly extending location posts 24 on either side thereof.

Figure 3:
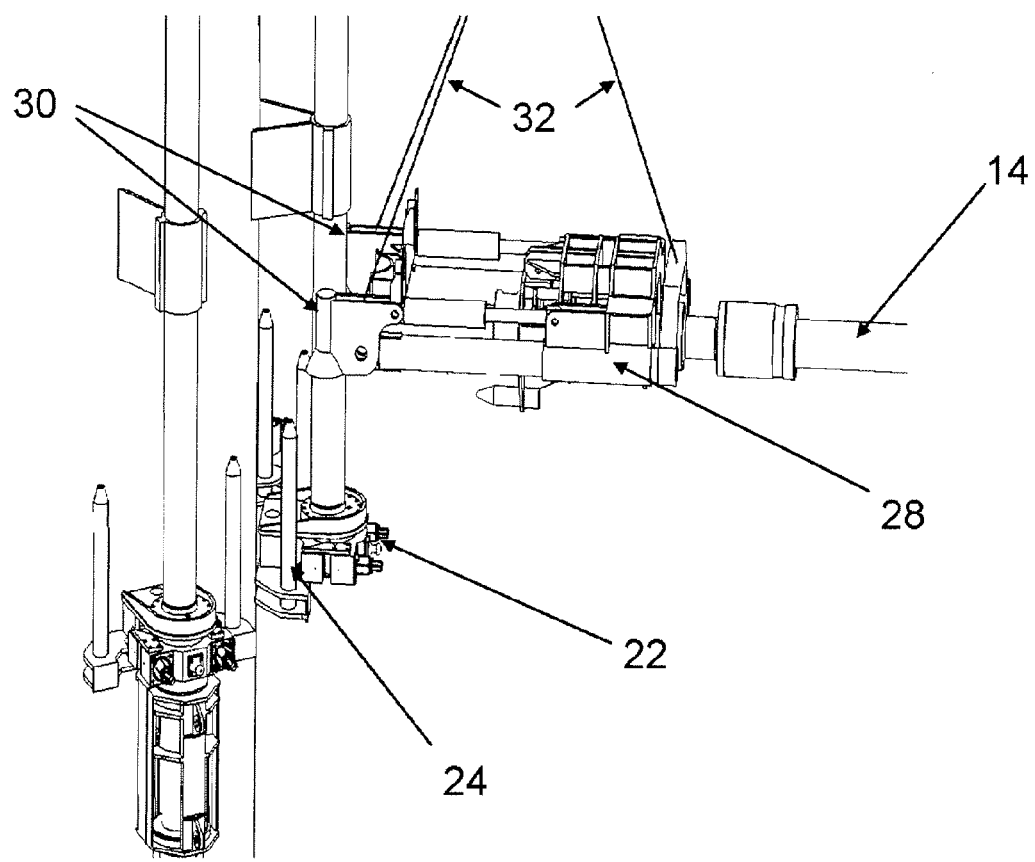
FIGS. 3 and 4 show a connection tool being used to connect to the riser base of FIG. 2.
Figure 4:
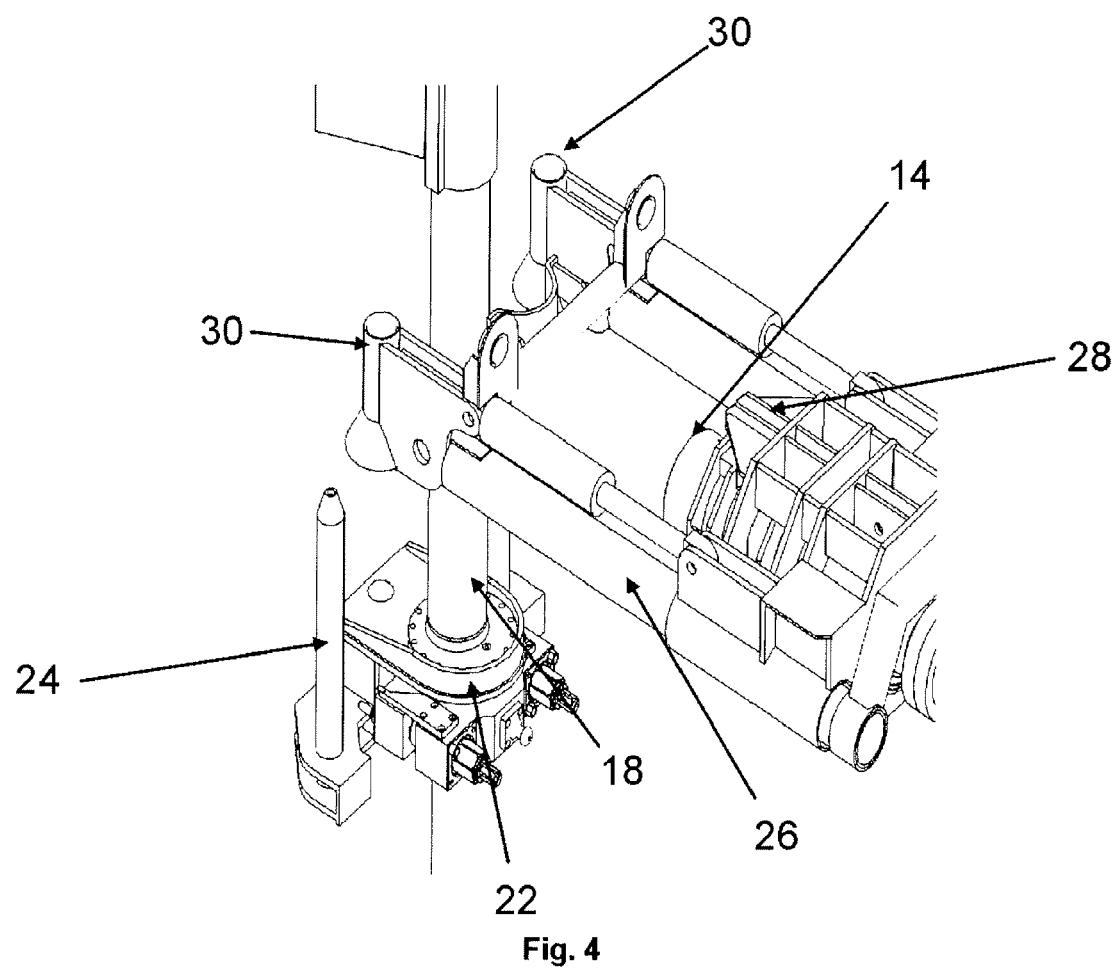

To connect the jumper 14 to the connection 20, a connection tool is used. The connection tool is shown in FIGS. 3 and 4 and comprises a chassis 26 having a moveable carrier 28 mounted thereon. The carrier 28 is provided with a mechanism to releasably connect to the end of the jumper 14. A pair of hinged connection sleeves 30 are provided at the front of the chassis 26 in a configuration corresponding to that of the location posts 24 on the connection porch 22. Because of the presence of the conduit 18 in this case, it is not possible to approach the connection porch 22 from directly above so the connection tool is supported from above 32 with the chassis 26 substantially horizontal and the suspension load evenly distributed. The connection tool is moved laterally until the sleeves 30 are over the posts 24. The carrier 28 is positioned towards the rear of the chassis 26.

Figure 5:
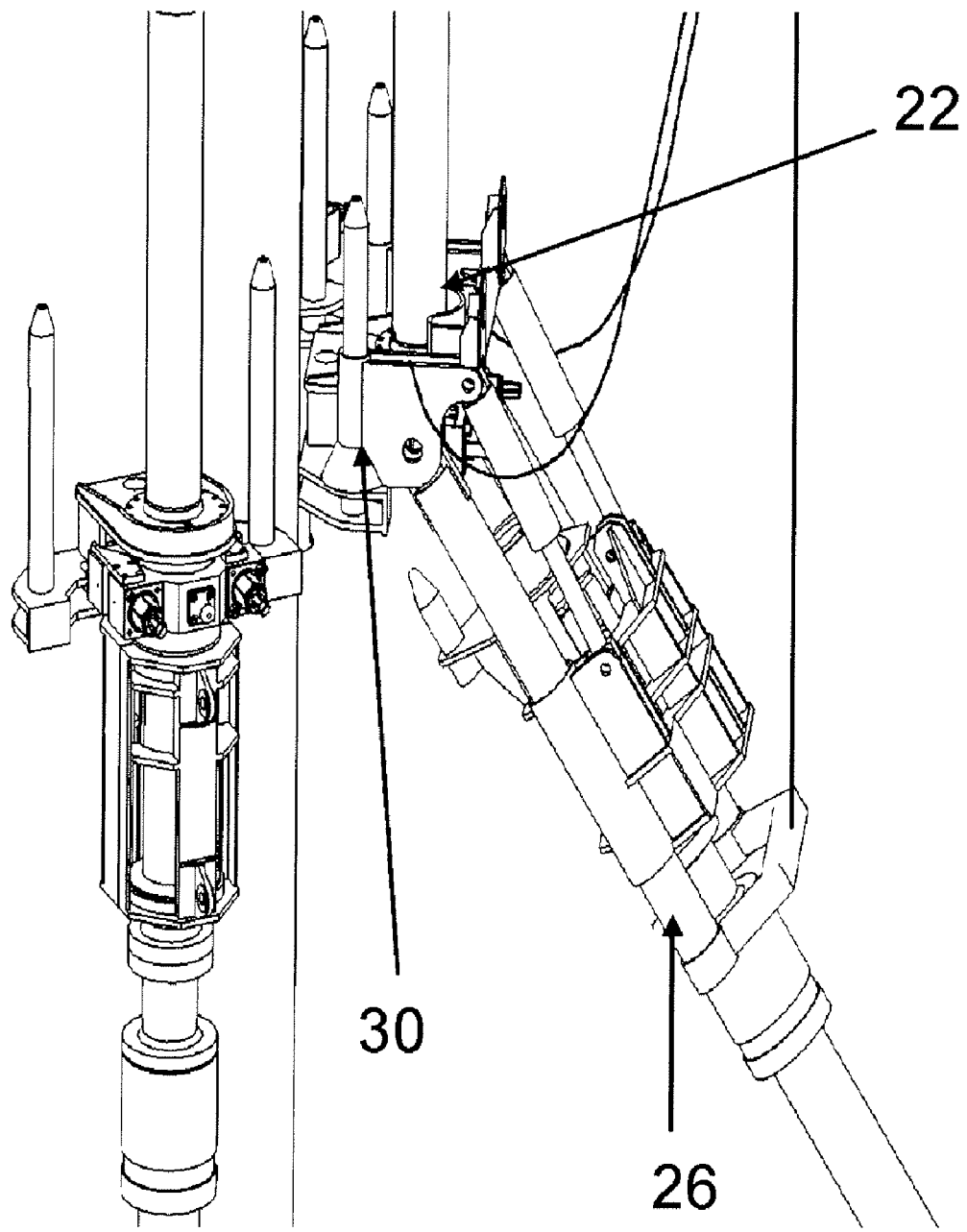
FIG. 5 shows an intermediate orientation of the connection tool.
Figure 6:
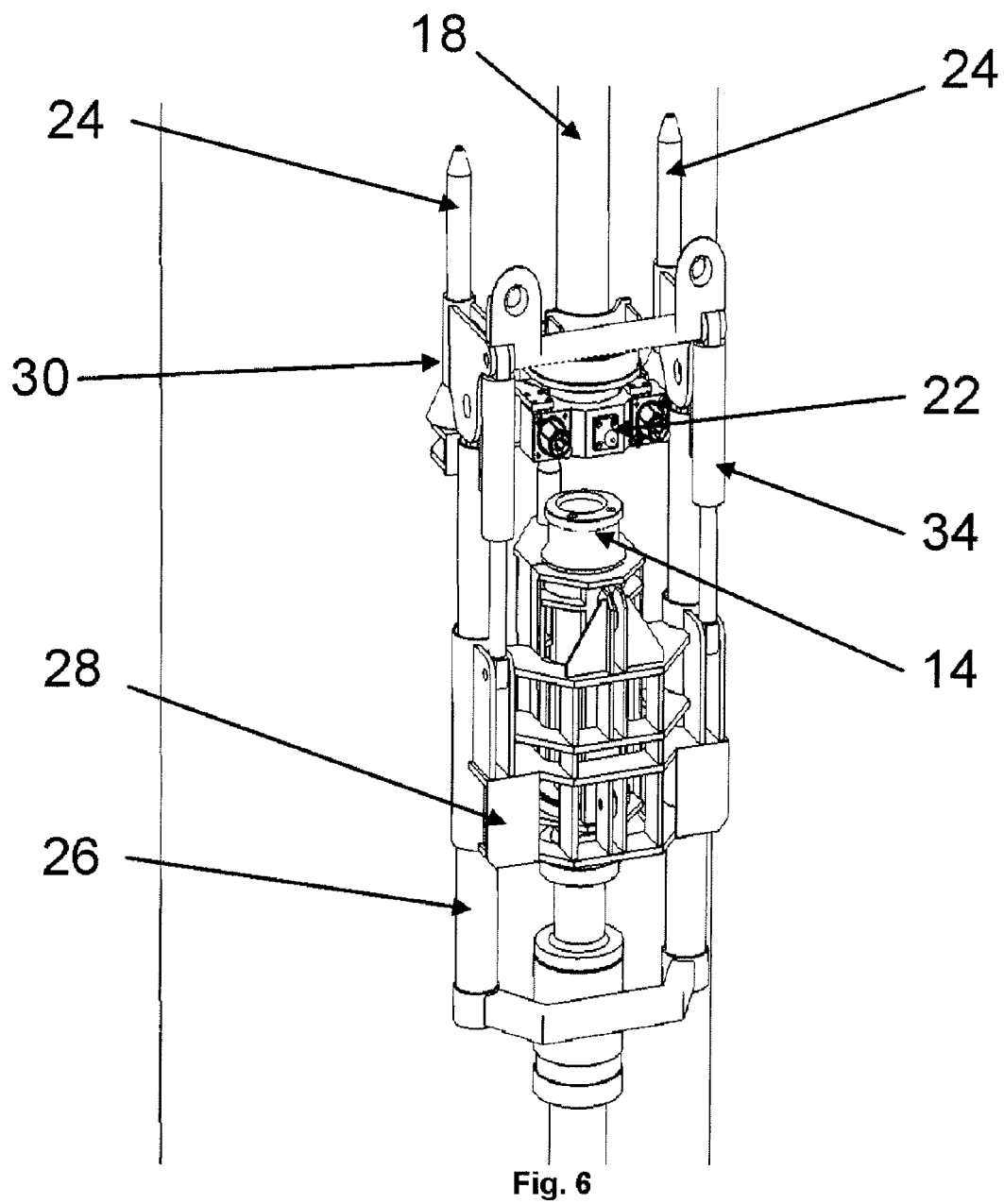
FIGS. 6 and 7 show the connection tool before and during connection.
Figure 7:
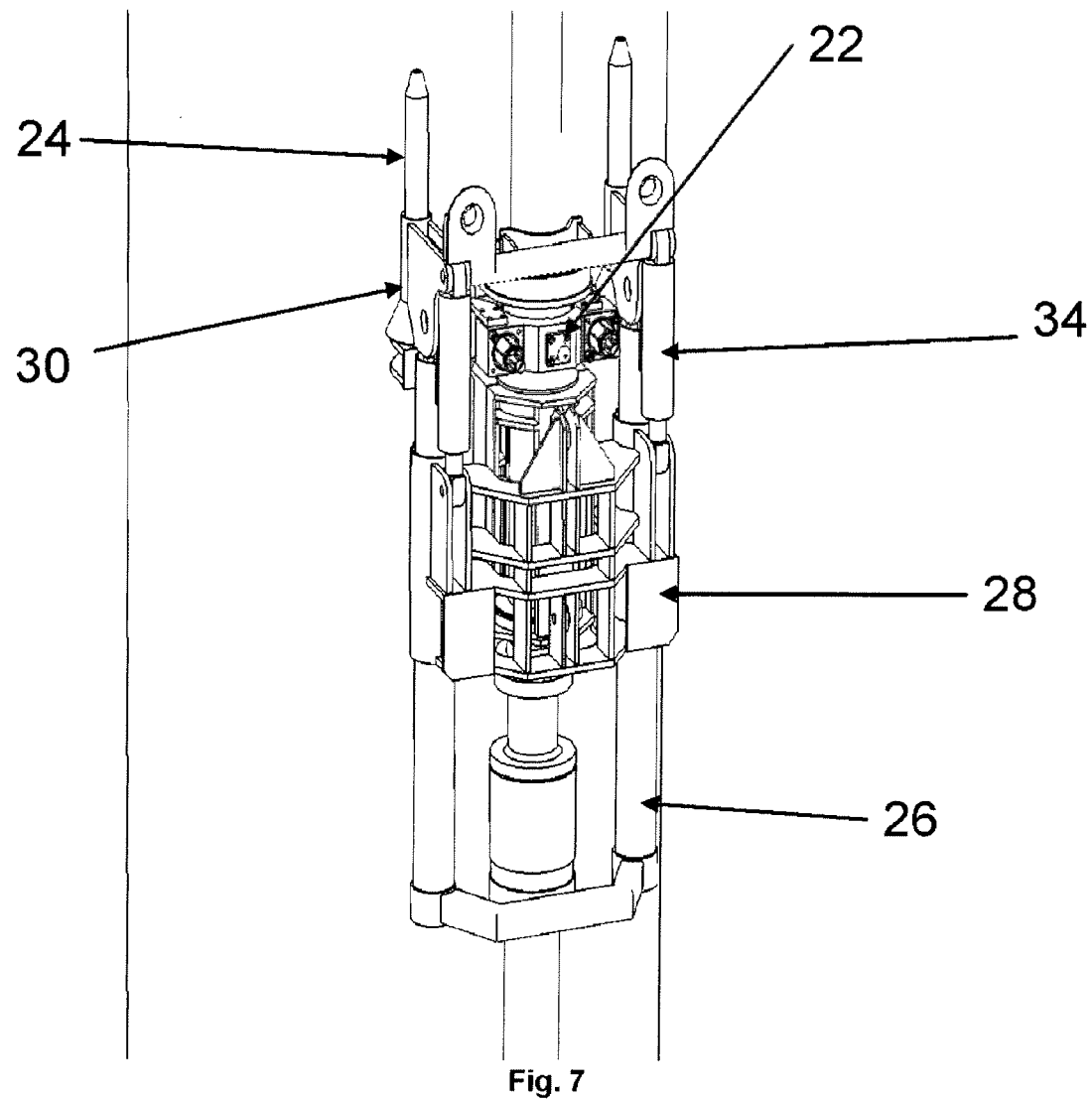

Once the sleeves 30 are over the posts 24, the tool is lowered so that the sleeves 30 slide onto the posts 24 and hold the front of the connection tool on the connection porch. As support is lowered, the hinges on the sleeves allow the chassis 26 to swing down below the connection porch 22 as is shown in FIG. 5. At this point, the chassis is supported from above only at the back part, the connection porch supporting the front. The chassis 26 is lowered until the end of the jumper 14 is immediately below the porch 22 as is shown in FIG. 6. The carrier 28 is then advanced along the chassis using a piston and cylinder arrangement 34 until the end of the jumper is up against the connection porch 22, at which point the connection can be made, as is shown in FIG. 7.

Figure 8:
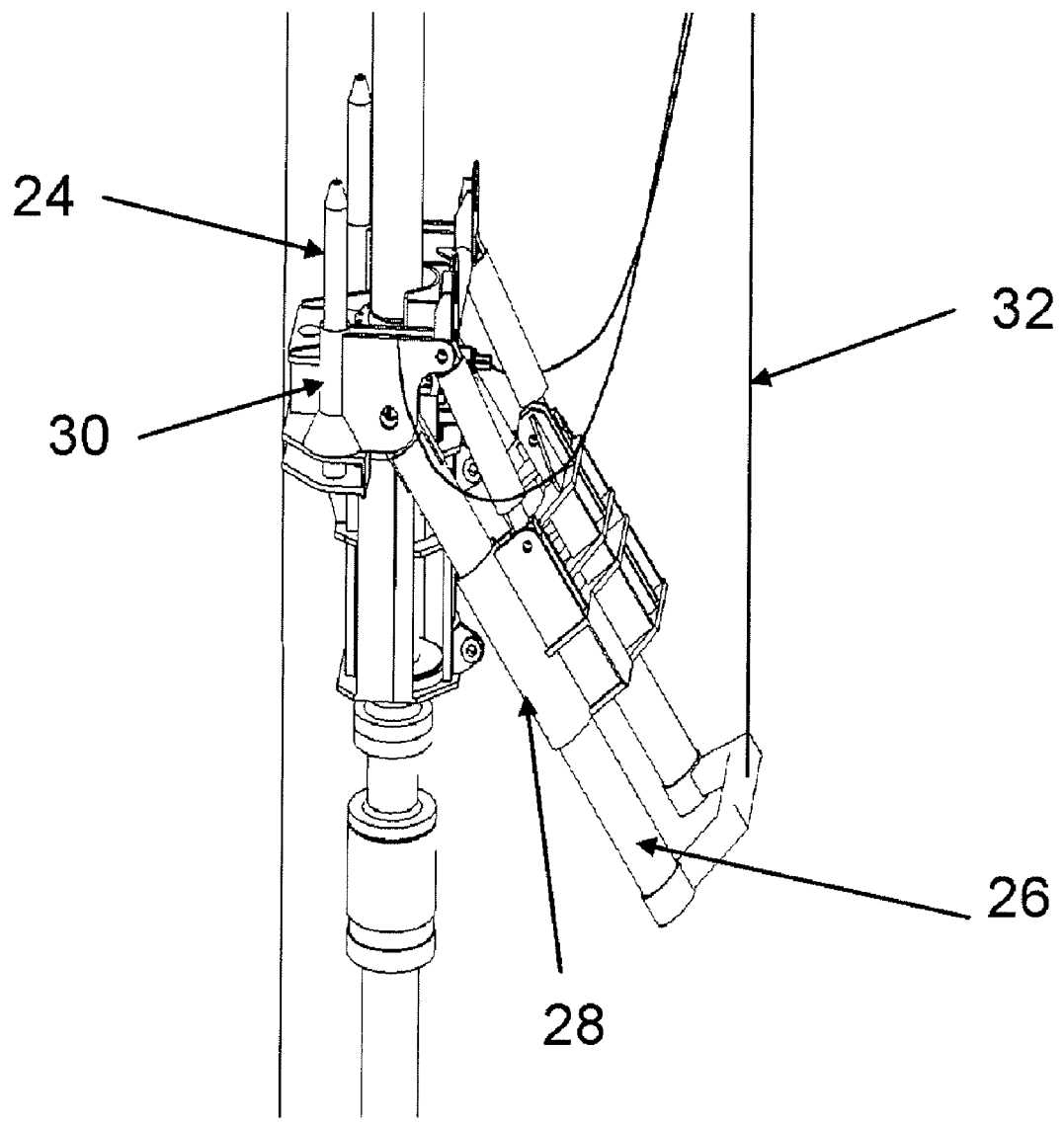
FIG. 8 shows the connection tool being lifted away from the pipeline after connection.

Once the connection is made, the jumper 14 is released from the carrier 28, and the chassis 26 raised by pulling on the support cable 32 from above. At high angles of orientation as shown in FIG. 8, there is a large vertical component along the chassis from the pull of the cable 32. Unless properly controlled, this could cause the sleeves 30 to be lifted off the posts 24 leaving the front of the chassis 26 unsupported. This would cause the tool to swing uncontrollably and possibly cause damage. Therefore, in accordance with the invention, a locking mechanism is included in the sleeves 30 to prevent accidental disengagement until the tool is back in the fully supported orientation. In the embodiment of FIGS. 3-8, this is when the chassis 26 is substantially horizontal. In other cases, the connection porch is approached from above with the chassis substantially vertical and it is then lowered to horizontal for connection and returned to vertical for disengagement.

Figure 9:
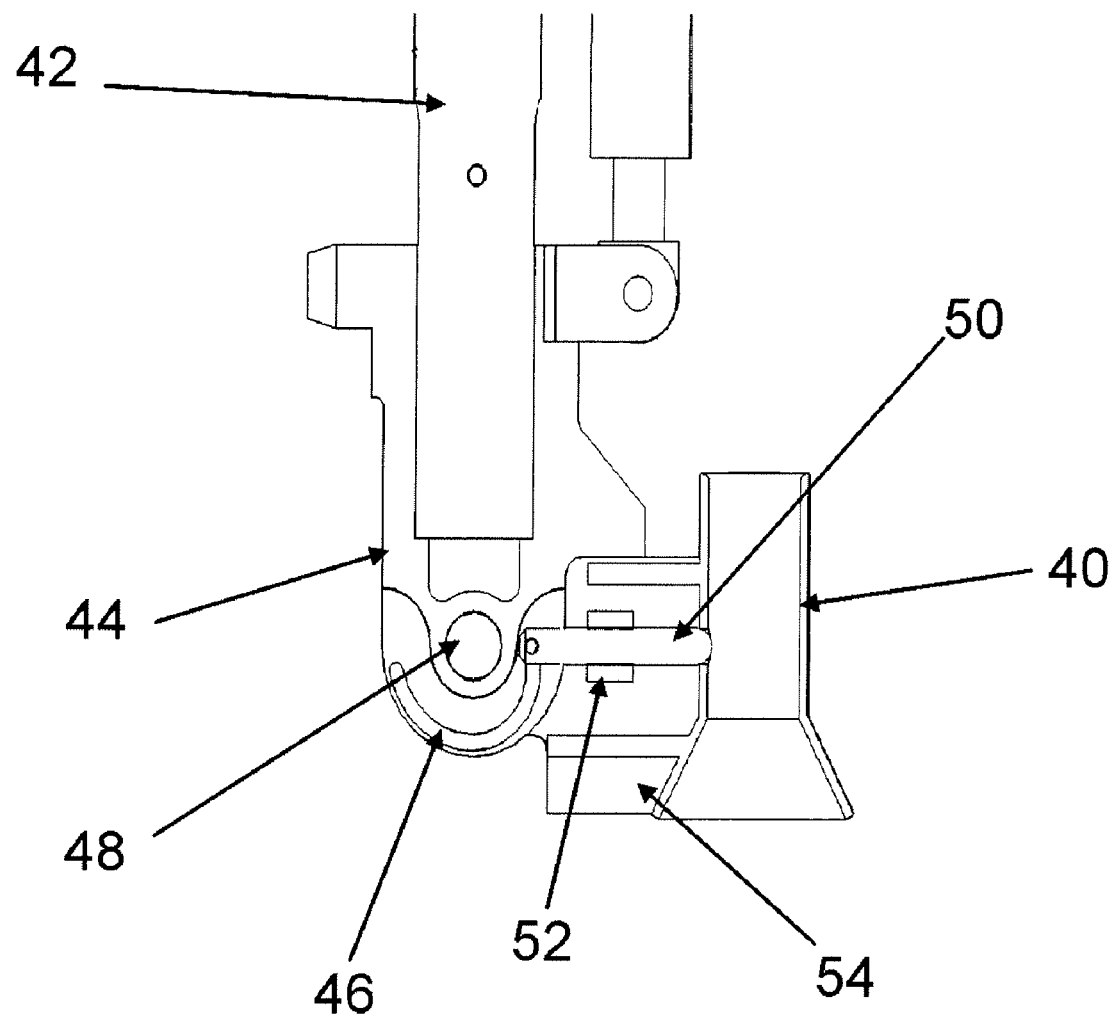
FIGS. 9-12 shown and embodiment of a locking mechanism for use in the present invention.
Figure 10:
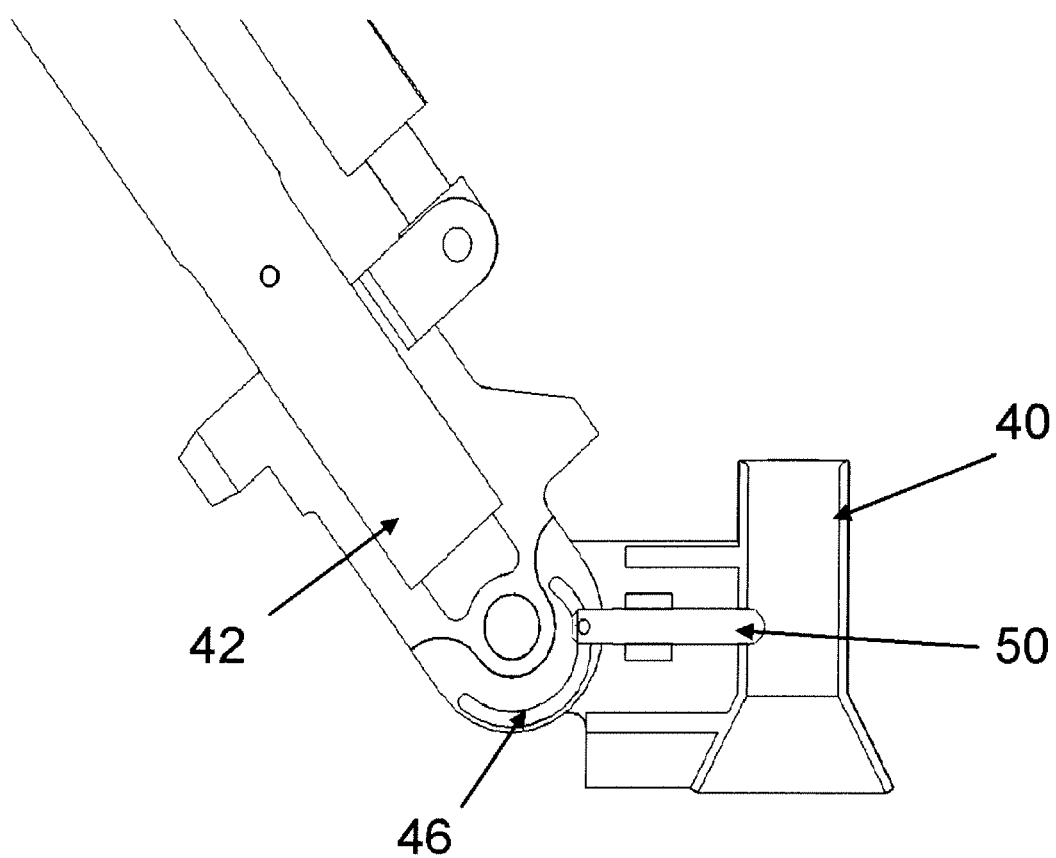
Figure 11:
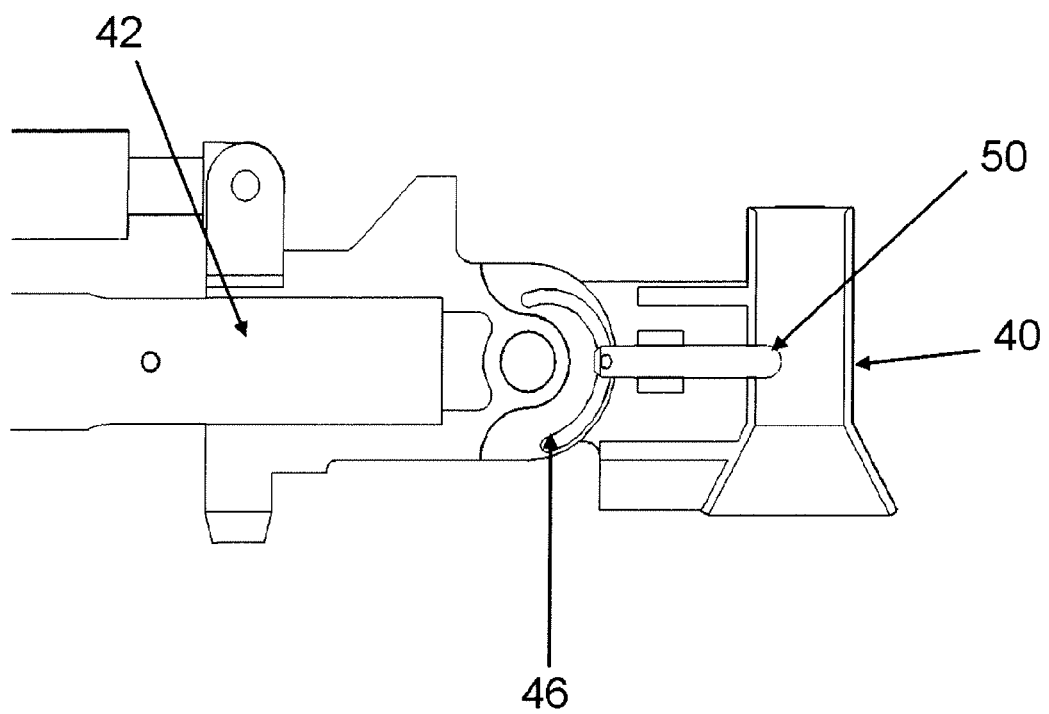
Figure 12:
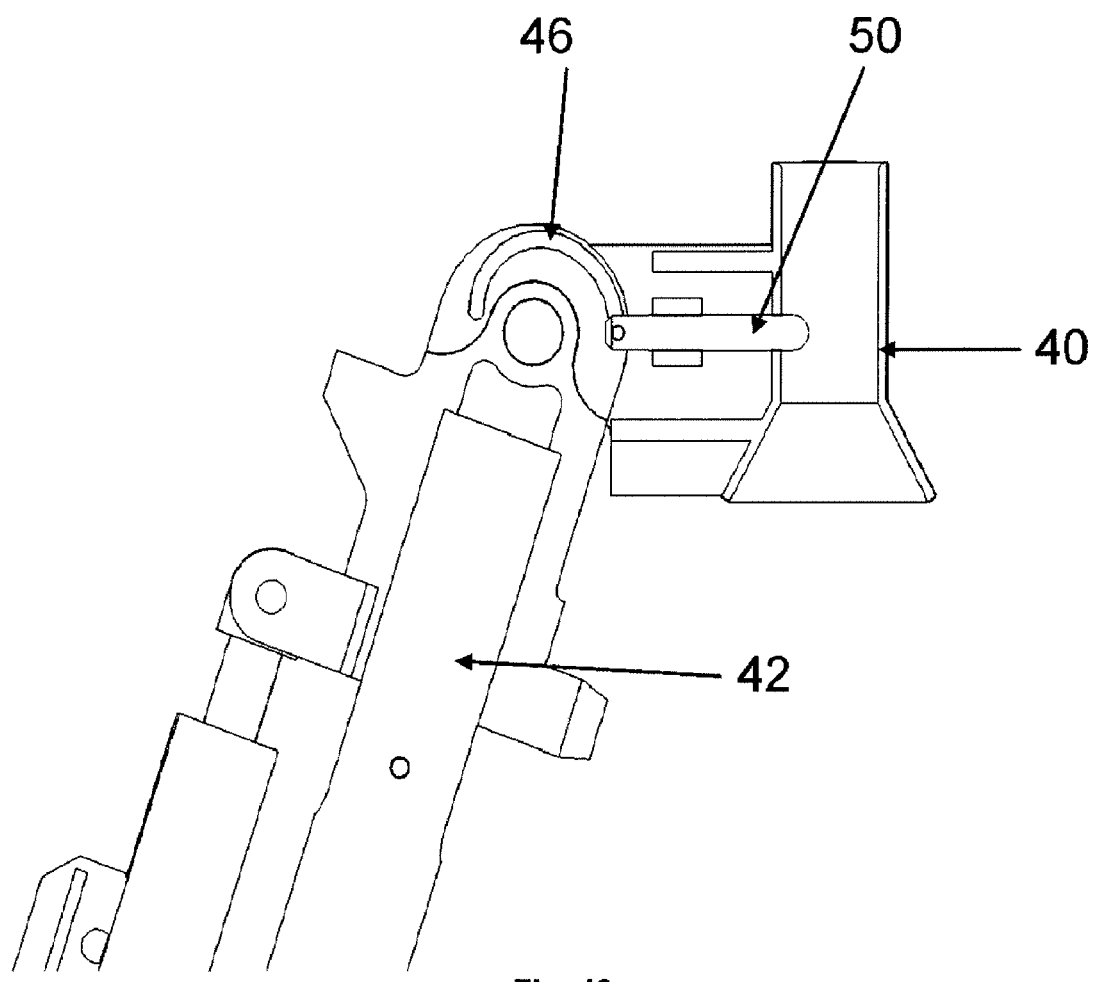

FIGS. 9-12 show details of a locking mechanism for use in such a vertical alignment. The sleeves 40 are mounted on the chassis 42 by means of a hinge 44. A cam surface 46 is formed around the hinge pivot 48 and one end of a locking peg 50 is engaged with the cam surface 46. The peg extends through a bore 52 in the sleeve mounting 54 so as to be extendable onto the bore of the sleeve 40. In the configuration of FIG. 9, the effect of the cam surface 46 is to hold the peg 50 out of the bore of the sleeve 40 so that it is free to slide on or off a locating post. As the chassis 42 is lowered from the vertical position with the sleeves 40 engaged on the posts (not shown), the effect of the cam surface 46 is to advance the peg 50 into the bore of the sleeve 40 to engage in a slot in the post. Consequently, disengagement of the sleeve 40 from the post is prevented by the peg 50 engaging in the slot in any or the azimuthal orientations shown in FIGS. 10-12. It is only possible to disengage the sleeves 40 by returning the chassis to the vertical position of FIG. 9 in which the cam surface 46 causes the peg 50 to be withdrawn from the slot.

While the embodiment of FIGS. 9-12 shows a vertical orientation for engagement and disengagement, it will be appreciated that the shape of the cam surface can be made such that the peg will be disengaged from the slot at any orientation of the chassis. For example, the peg could only be withdrawn when the chassis is horizontal as in FIGS. 3-8.

Other changes can be made without departing from the scope of the invention. For example, a spring can be included against which the peg must be pushed by the cam surface. This will help ensure disengagement when the chassis is in the correct orientation. Also, the cam surface could be replaced by another mechanism such as a hydraulic or electric system to advance and withdraw the peg depending on the orientation of the chassis. The peg could be replaced by any other locking member that can engage the post.

The invention claimed is:

1. A connection tool for connecting a pipeline to a subsea connection structure which includes a connection porch into which the pipeline is connected, at least one locating post being positioned adjacent to the connection porch, the tool comprising:

a tool chassis;

a carrier mounted on the chassis and adapted to releasably carry the pipeline to be connected to the connection structure; and at least one locating member positioned at the front of the chassis so as to be engageable with the or each locating post on the connection porch to hold the chassis adjacent to the connection porch, a hinge connecting the locating member to the chassis that allows pivoting movement around a transverse axis such that the azimuthal orientation of the chassis relative to the connection porch can be varied when the or each locating member is engaged with its respective locating post, wherein the or each locating member includes a locking member that engages its respective locating post when the locating member is engaged thereon and prevents disengagement of the locating member unless the chassis is in a predetermined azimuthal orientation relative to the connection porch.

2. A connection tool as claimed in claim 1, wherein the locating member comprises a sleeve that can slide over the locating post to hold the chassis in position relative to the connection porch.

3. A connection tool as claimed in claim 2, wherein a pair of hinged sleeves are provided on the chassis in an arrangement corresponding to that of a pair of locating posts on the connection porch.

4. A connection tool as claimed in claim 1, wherein the hinge includes a cam surface that acts on the locking member.

5. A connection tool as claimed in claim 4, wherein hinging of the chassis away from the predetermined azimuthal orientation causes the cam surface to act on the locking member to urge it into engagement with the locating post.

6. A connection tool as claimed in any preceding claim, wherein the locking member comprises a peg that engages in a slot in the locating post.

7. A method of connecting one end of a pipeline into a connection porch on a subsea connection structure, at least one locating post being positioned adjacent to the connection porch, the method comprising:

attaching the end of the pipeline to a connection tool comprising:
  a tool chassis;
  a carrier mounted on the chassis for carrying the end of the pipeline to be connected to the connection structure;
  at least one locating member positioned at the front of the chassis, the locating member including a locking member; and
  a hinge connecting the locating member to the chassis;
maneuvering the connection tool such that the locating member engages with the locating post when the chassis is in a predetermined azimuthal orientation relative to the connection porch;
varying the azimuthal orientation of the chassis relative to the connection porch, thereby causing the locking member to engage the locating post and prevent disengagement of the locating member;
connecting the end of the pipeline to the connection structure at the connection porch;
detaching the pipeline from the connection tool;
returning the chassis to the predetermined azimuthal orientation such that the locking member is disengaged from the locating post;
disengaging the locating member from the locating post; and
maneuvering the connection tool away from the connection structure.

8. A method as claimed in claim 7, wherein the connection porch faces in a downward direction and the locating post projects upward from the connection porch, the method comprising engaging the locating post with the locating member with the chassis in the predetermined orientation, hinging the chassis downwards to bring the end of the pipeline into alignment with the downward facing connection porch, connecting the pipeline to the connection porch and raising the chassis back to the predetermined orientation for disengagement from the locating post.

9. A method as claimed in claim 7, when performed using a connection tool as claimed in any of claims 1-5.

* * * * *